United States Patent
Poda

(10) Patent No.: US 10,506,377 B2
(45) Date of Patent: Dec. 10, 2019

(54) SYSTEM AND METHOD FOR TRANSMITTING DYNAMIC CONTENT TO MOBILE DEVICES

(71) Applicant: youRhere Inc., Calgary (CA)

(72) Inventor: Daniel Poda, Calgary (CA)

(73) Assignee: YOURHERE INC., Toronto (CA)

( * ) Notice: Subject to any disclaimer, the term of this patent is extended or adjusted under 35 U.S.C. 154(b) by 0 days.

(21) Appl. No.: 16/123,564

(22) Filed: Sep. 6, 2018

(65) Prior Publication Data

US 2019/0082297 A1 Mar. 14, 2019

Related U.S. Application Data

(60) Provisional application No. 62/556,769, filed on Sep. 11, 2017.

(51) Int. Cl.
| | |
|---|---|
| *H04W 24/00* | (2009.01) |
| *H04W 4/024* | (2018.01) |
| *G06K 7/14* | (2006.01) |
| *H04W 4/021* | (2018.01) |
| *H04W 4/33* | (2018.01) |
| *H04W 4/80* | (2018.01) |

(52) U.S. Cl.
CPC .......... *H04W 4/024* (2018.02); *G06K 7/1404* (2013.01); *H04W 4/021* (2013.01); *H04W 4/33* (2018.02); *H04W 4/80* (2018.02)

(58) Field of Classification Search
CPC ......... H04W 4/024; H04W 4/33; H04W 4/80; H04W 4/021; G06K 7/1404
USPC .......................................................... 455/456
See application file for complete search history.

(56) References Cited

U.S. PATENT DOCUMENTS

| | | | |
|---|---|---|---|
| 9,068,846 B1 | 6/2015 | Boerger | |
| 2001/0054066 A1* | 12/2001 | Spitzer | H04L 29/06 709/203 |
| 2010/0036670 A1 | 2/2010 | Hill et al. | |
| 2011/0022468 A1 | 1/2011 | Muster et al. | |
| 2012/0190301 A1 | 7/2012 | Hart | |
| 2013/0054752 A1* | 2/2013 | Herwig | H04L 67/06 709/219 |
| 2013/0138956 A1* | 5/2013 | Swist | H04N 21/41415 713/168 |
| 2014/0156186 A1 | 6/2014 | Liu et al. | |
| 2015/0051994 A1 | 2/2015 | Ward et al. | |
| 2016/0125390 A1 | 5/2016 | Cedo Perpinya et al. | |
| 2017/0323279 A1* | 11/2017 | Dion | G07F 19/20 |

OTHER PUBLICATIONS

ISA/CA, International Search Report arid Written Opinion, dated Jan. 14, 2019, re PCT International Patent Application No. PCT/IB2018/056816.

* cited by examiner

*Primary Examiner* — Amancio Gonzalez

(74) *Attorney, Agent, or Firm* — Perry + Currier

(57) ABSTRACT

A method of transmitting dynamic content to a mobile device includes: storing content in a memory of a kiosk deployed in a facility; receiving, via an input device of the kiosk, a command to present the a portion of the content; responsive to receiving the command: controlling an output device of the kiosk to present the portion of the content; and transmitting, to a routing server via a network, a preconfigured identifier of the kiosk and an identifier of the portion of the content, for subsequent retrieval by a mobile computing device.

14 Claims, 4 Drawing Sheets

SYSTEM AND METHOD FOR TRANSMITTING DYNAMIC CONTENT TO MOBILE DEVICES

CROSS-REFERENCE TO RELATED APPLICATION

This application claims priority from U.S. provisional patent application No. 62/556,769, filed Sep. 11, 2017, the contents of which is incorporated herein by reference.

FIELD

The specification relates generally to communications with mobile devices, and specifically to a system and method for transmitting dynamic content to mobile devices.

BACKGROUND

Fixed kiosks are often deployed in facilities to provide mapping information and directions to patrons of the facilities. As the kiosks are fixed, however, such mapping information may only be viewed at the kiosks themselves, and becomes inaccessible when the patron moves away from the kiosk to travel toward a destination presented on the kiosk. The patrons frequently carry mobile computing devices, and some systems permit such devices to obtain mapping information independently from the kiosks. However, such systems typically require additional software to be installed on the mobile devices (e.g. distinct applications corresponding to each facility), increasing the complexity of the systems, and imposing computational load and network usage on the mobile devices.

BRIEF DESCRIPTIONS OF THE DRAWINGS

Embodiments are described with reference to the following figures, in which.

DETAILED DESCRIPTION

Figure 1:
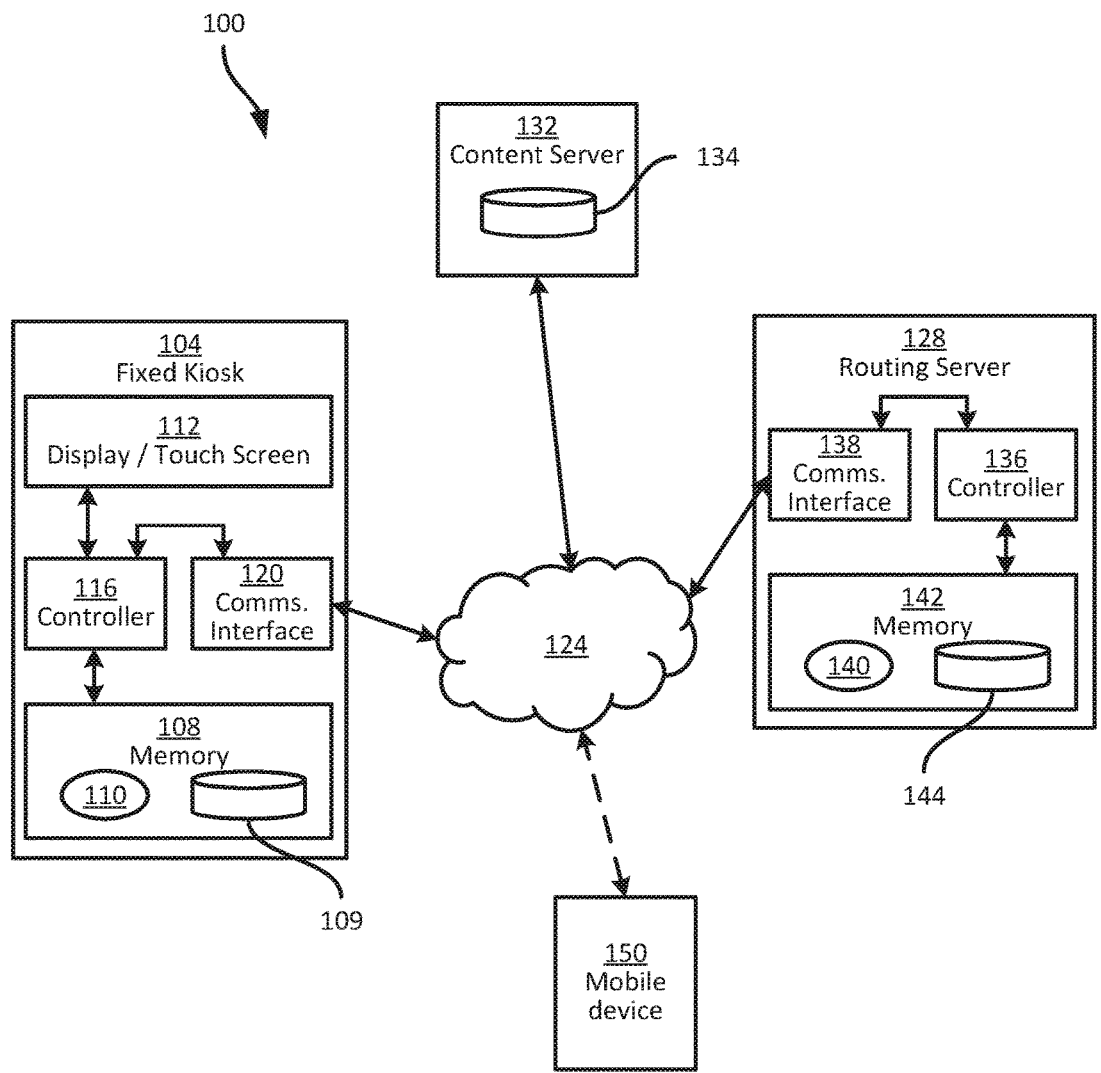
FIG. 1 depicts a system for dynamically transmitting content to mobile devices.

FIG. 1 depicts a system 100 for dynamically transmitting content to mobile devices. In the examples discussed below, the content transmitted to the mobile device(s) is mapping information (e.g., portions of a facility map surrounding one or more selected locations), In other examples, however, the content can include any one or more of the above-mentioned mapping information, scheduling information (e.g. hours of operation of a facility), event information (e.g. locations, dates and times of events), and the like.

The system 100 includes a kiosk 104 deployed at a fixed location within a facility, such as a hospital, a shopping mall, or the like. A plurality of kiosks may be deployed at distinct fixed locations within the facility, each of which may operate as described below in connection with the kiosk 104. The kiosk 104 includes a non-transitory computer-readable storage medium in the form of a memory 108 (e.g. one or more integrated circuits including any suitable combination of volatile and non-volatile memory) storing content in a repository 109, which in the present example is mapping information corresponding to the facility (e.g. a graphical map of the facility). The kiosk 104 also includes an output device for presenting portions of the mapping information, and an input device for receiving commands indicating which portions of the mapping information to present. In the present example, the input and output devices are implemented as a display with an integrated touch screen 112. In other embodiments, the kiosk 104 can be provided with separate input and output devices (e.g. a display and a distinct touch pad). Various other input and output devices are also contemplated, including microphones, speakers and the like.

The kiosk further includes a controller 116, such as a central processing unit (also referred to simply as a processor), an application-specific integrated circuit (ASIC) or the like. Via execution of computer-readable instructions stored in the memory 108, such as a control application 110, the controller 116 is configured to receive commands via the touch screen, select portions of the mapping information from the memory 108 (i.e. from the repository 109) and present the selected portions on the display 112. The controller 116 can also be configured to generate path information illustrating directions between a location of the kiosk 104 (e.g., preconfigured in the memory 108 with respect to the above-mentioned facility map) and a location on the map selected via the above-mentioned input commands. The path information can also be presented on the display 112, for example as an overlay on the mapping information.

The kiosk 104 also includes a communications interface 120, such as an Ethernet controller, wireless radio assembly, or the like, for communicating with other computing devices over a network 124 (e.g. any one of, or any suitable combination of, local area networks and wide area networks, including the Internet). In particular, the kiosk 104 is configured to communicate with a routing server 128 of the system 100, as will be discussed below in greater detail. The kiosk 104 may also be configured to communicate, via the network 124, with a content server 132 hosting a master content repository 134. For example, the content server 132 can be configured to periodically provide content updates to the kiosk 104 (e.g. updates to be applied to the repository 109, reflecting changes to the mapping information defined in the repository 109).

The routing server 128 includes a controller 136, such as a central processing unit (also referred to simply as a processor), an application-specific integrated circuit (ASIC) or the like. The controller 136 is coupled to communications interface 138 enabling the routing server 128 to communicate with other computing devices via the network 124. Via execution of computer-readable instructions such as a routing application 140 stored in a memory 142 coupled to the controller 136, the controller 136 is configured to receive data from the kiosk 104 responsive to user interaction with the kiosk 104 (as will be discussed below), and to store the data in a routing repository 144 for subsequent retrieval and provision to a mobile device 150, as will be discussed below. Although the routing server 128 and the content server 132 are shown as distinct physical components of the system 100, in other embodiments the functionality of the routing server 128 and the content server 132, as discussed above, may be implemented on common hardware (e.g. on one physical server or associated set of servers).

The system 100 also includes the above-mentioned mobile device 150, such as a smartphone, tablet computer, or the like, typically operated by a patron of the above-mentioned facility. The mobile device 150 includes a communications interface enabling the mobile device 150 to communicate with other computing devices (e.g. the routing server 128) via the network 124. The communications interface of the mobile device 150 can also enable to the device 150 to communicate locally with other computing devices, such as the kiosk 104 or a component physically supported by the kiosk 104 (though not necessarily communicatively connected to the controller 116). The communications interface of the mobile device 150, in other words, can include any suitable combination of radios, network controllers and the like, to enable local and/or wide-area communications. The mobile device 150 also includes a controller (e.g. a processor, ASIC or the like) interconnected with a memory for storing and executing one or more applications, such as a web browser application. The mobile device 150 also includes input and output devices, for example in the form of a touch screen integrated with a display. As will be discussed in greater detail below, the mobile device 150 also includes a data capture module configured to capture identifying data from the kiosk 104. The data capture module can take a variety of forms, corresponding to the various mechanisms by which the kiosk 104 can make the identifying data available. Example data capture modules include a camera, the above-mentioned communications interface (e.g. a Bluetooth or other short-range radio component of the communications interface), and the like.

In general, the kiosk 104, the routing server 128 and the mobile device 150 interact to enable the selection of portions of mapping information at the kiosk (e.g. by manipulation of the display/touch screen 112 by an operator of the mobile device 150), and the transmission of those portions of the mapping information to the mobile device 150. To that end, as noted above, the content server 132 stores a copy of the mapping information in the master repository 134, and as will be seen below, transmits portions of the mapping information to the mobile device 150 in response to requests from the mobile device 150.

Figure 2:
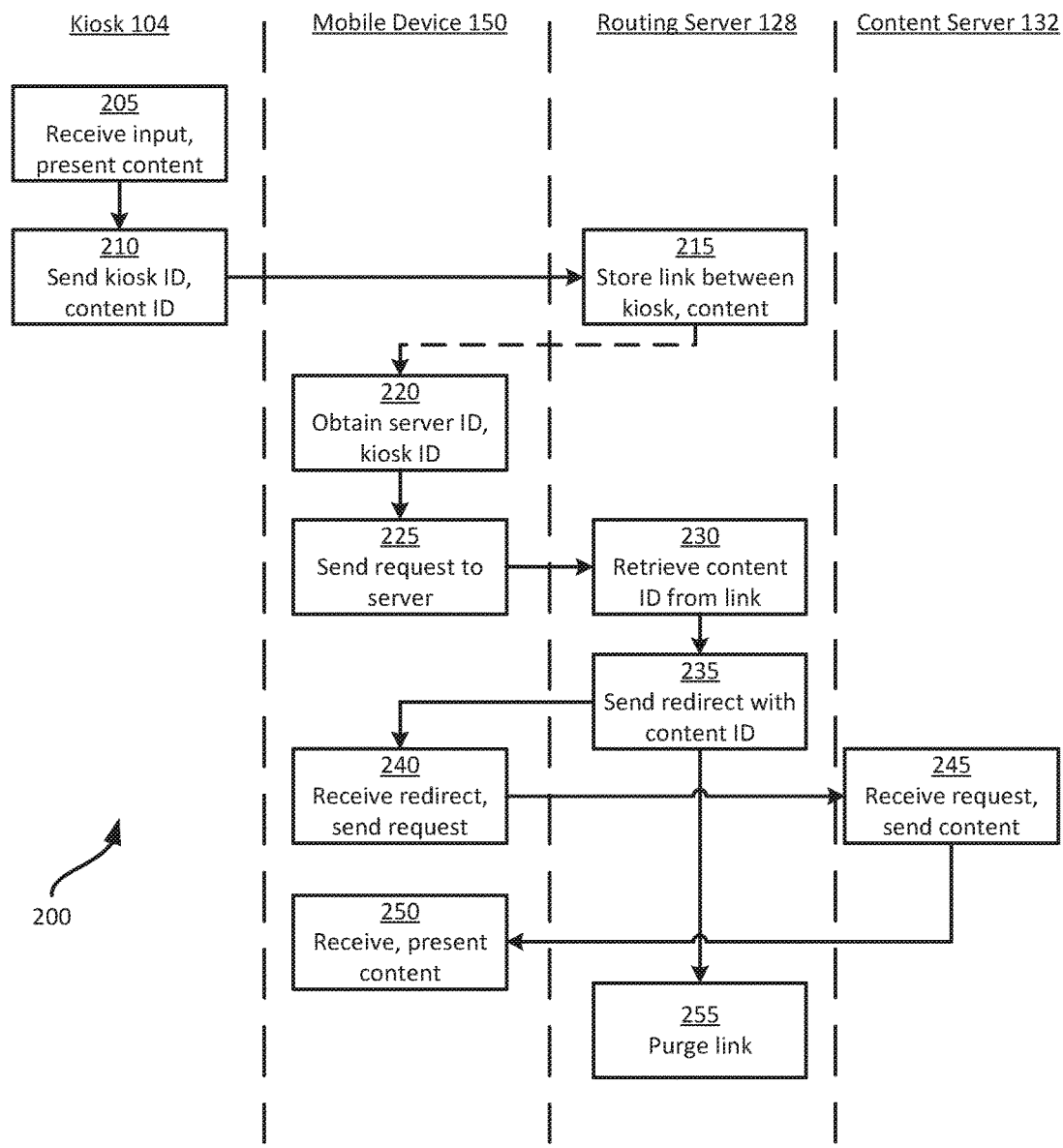
FIG. 2 depicts a method of dynamically transmitting content to mobile devices.
Figures 3A, 3B:
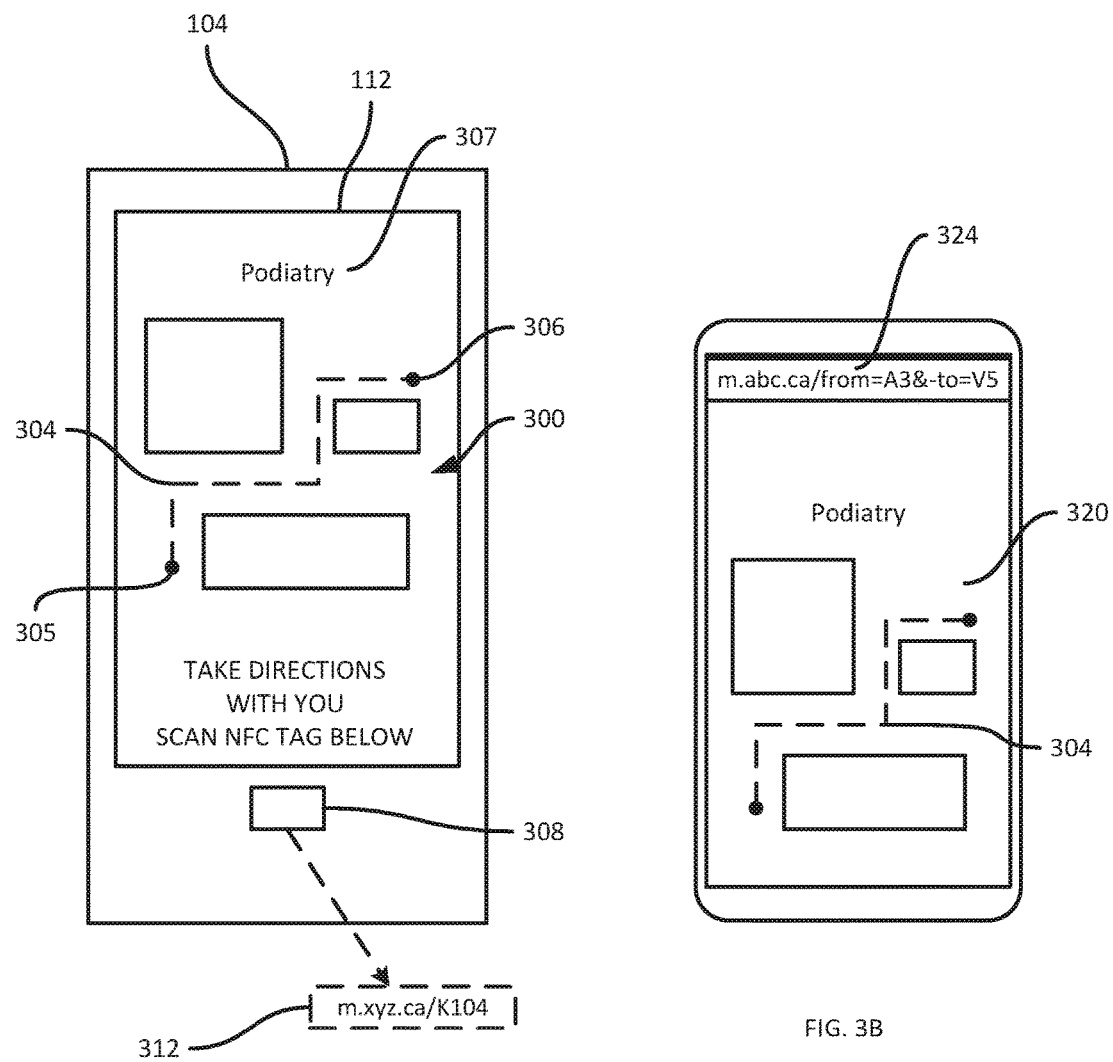
FIGS. 3A and 3B depict example data displayed by the kiosk and mobile device of FIG. 1 during the performance of the method of FIG. 2.

Turning to FIG. 2, a method 200 of dynamically transmitting content to mobile devices (such as the mobile device 150) is illustrated; the method will be described below in conjunction with its performance on the system 100. At block 205, the kiosk 104 is configured to receive input from an operator of the mobile device 150 via the display/touch screen 112, and to present content from the repository 109 on the display/touch screen 112, such as a portion of a map of the facility in which the kiosk is deployed and a path from the location of the kiosk 104 to a destination selected by the operator. That is, the input received at block 205 can include a search request for a particular destination (e.g. a store, department or the like), and presentation of the content from the repository 109 can include retrieving the preconfigured location of the kiosk 104 itself and computing a path from the preconfigured location to the destination. The path generation mentioned above can be performed according to any of a variety of suitable path generation operations, examples of which will readily occur to those skilled in the art. Turning to FIG. 3A, the kiosk 104 is shown having presented a portion 300 of a map on the display 112, along with a path 304 generated by the controller 116 between a preconfigured kiosk location 305 (i.e. a start point of the path 304) and a destination 306 selected by the operator of the mobile device 150. A name 307 of the destination (e.g. the podiatry department of a healthcare facility such as a hospital) may be presented with the map 300.

Returning to FIG. 2, at block 210, the kiosk 104 is configured to transmit to the routing server 128, via the network 124, an identifier of the kiosk 104 (e.g., uniquely identifying the kiosk 104 among other kiosks in the same facility, or among kiosks at a plurality of facilities) and a content identifier. The kiosk identifier is preconfigured and stored in the memory 108, for example as a string (e.g., "K104"). The content identifier serves to identify the portion of the map 300 presented at block 205, and the path 304 shown on the display 112. The content identifier may, for example, be a location identifier (in a frame of reference established in the mapping information stored by the kiosk 104, for example), or a pair of location identifiers referring to a starting point (typically the preconfigured location 305 of the kiosk 104) and the endpoint of the path 304 (that is, the selected destination 306 referred to above). Thus, in the present example, the kiosk 104 transmits the kiosk identifier "K104" and a content identifier in the form of the location identifiers "from=A3" (corresponding to the kiosk location 305) and "to=V5" (corresponding to the destination 306) at block 210. More specifically, in the present example, the content identifier is transmitted at block 210 in the form of a URL containing the above location identifiers (e.g., "m.abc.ca/from=A3&to=V5"). As will be discussed below, the URL also identifies the content server 132 as the source of the content.

At block 215, the server 128 is configured to receive the content identifier and the kiosk identifier sent at block 210. Thus, the routing server 128, in the present example, receives a message from the kiosk 104, the body of which contains the above-mentioned URL. The server 128 is further configured to store a link in the routing repository 144, between the content identifier and the kiosk identifier, thus indicating what content the kiosk 104 is currently displaying (i.e. presenting on the touch screen/display 112). As will now be apparent, the routing server 128 can store a plurality of such links for a respective plurality of kiosks 104, either within the same facility or distributed across multiple facilities. The link can be stored with a timestamp indicating the date and/or time of receipt of the content and kiosk identifiers. The link includes both the kiosk identifier and the content identifier. Continuing with the above example in which the kiosk 104 transmits the URL "m.abc.ca/from=A38&to=V5" to the routing server 128, along with its own identifier "K104", the routing server 128 can be configured to add a record to the repository 144 including a first field containing the kiosk identifier K104, a second field containing the above URL (i.e. the content identifier), and a third field containing the date and time of receipt of the kiosk and content identifiers.

At block 220, the mobile device 150 is configured to obtain a server identifier and a kiosk identifier. The kiosk and server identifiers are typically obtained from the kiosk 104, but need not be actively transmitted by the kiosk 104; the transition from block 215 to block 220 is therefore shown in dashed lines. For example, the identifiers may be encoded in a machine-readable indicium (e.g. a QR code) presented on the display 112, printed on a housing of the kiosk 104, or the like. In such examples, the mobile device 150 is configured to obtain the identifiers by capturing an image of the indicium ad decoding the identifiers from the image. In other examples, as shown in FIG. 3A, the kiosk 104 includes a local communications interface 308 (e.g. integrated with the interface 120, or implemented as a discrete component of the kiosk 104) such as a near-field communication (NFC) tag or other radio frequency identification (RFID)-based tag, a Bluetooth low energy (BLE) beacon, or the like. The local communications interface 308 stores the kiosk and server identifiers, and is configured to transmit the identifiers to the mobile device 150 according to any suitable short-range communications protocol. The mobile device 150 therefore includes a complementary interface, as noted earlier in connection with FIG. 1, and is configured to obtain the identifiers via any suitable sequence of communications with the interface 308, dependent on the technology employed to implement the interface 308. In some examples, the local communications interface 308 is implemented as a BLE interface, and the kiosk and server identifiers are provided to the mobile device 104 according to the Eddystone protocol.

Of particular note, the server and kiosk identifiers can be stored or otherwise presented on or by the kiosk 104 in a substantially fixed manner. That is, the identifiers need not be updated over time, irrespective of which mobile device 150 obtains the identifiers, and irrespective of what content is presented on the display 112 when the mobile device 150 obtains the identifiers. Through the mechanisms discussed herein, the mobile device 150 is nevertheless provided with dynamic content from the repository 144.

The kiosk identifier obtained at block 220 is the same identifier as that sent to the routing server 128 by the kiosk 104 at block 210 (i.e., "K104" in the present example). The server identifier identifies a network address of the routing server 128 (e.g. a URL for the routing server 128). At block 225, the mobile device 150 is configured to send a request to the server 128 employing the above-mentioned URL. Specifically, in the present example, the identifiers obtained at block 220 are obtained as a single string, such as a URL identifying the routing server 128 and including the kiosk identifier as an argument. An example string 312 is shown in FIG. 3A, including the routing server identifier "m.xyz.ca" and the kiosk identifier "K104". Specifically, in the present example the routing server identifier and the kiosk identifier are transmitted to the mobile device 150 as a URL (e.g. formatted according to the Eddystone protocol, as noted above).

At block 230, the routing server 128 is configured to receive the request from the mobile device 150 and retrieve the content identifier (which is not included in the request sent at block 225) previously stored in the repository 144 in association with the kiosk identifier at block 215. That is, the routing server 128 is configured to retrieve the content identifier from the repository 144 using the kiosk identifier received at block 230 to look up the corresponding link (stored at block 215) containing the content identifier. Having retrieved the content identifier (the above-mentioned URL "m.abc.ca/from=A3&to=V5" in the present example), the routing server 128 is configured to provide the content identifier to the mobile device 150 at block 235. The provision of the content identifier at block 235 serves to redirect the mobile device 150 to the content server 132, as the content identifier contains the domain "m.abc.ca", which identifies the content server 132.

At block 240, the mobile device 150 is configured to receive the redirect URL mentioned above (i.e., the content identifier, "m.abc.ca/from=A3&to=V5") and send a further request to the content server 132 according to the redirect URL. The content server 132, in turn, is configured to receive the request at block 245, and to retrieve and send the relevant portion of the mapping information from the repository 134 (which, as noted earlier, contains a master copy of the map content in the repository 109 of the kiosk 104). In particular, the content redirect string provided to the mobile device 150 and requested from the content server 132 serves to identify a portion of the map as stored at the content server 132, for example bounded by a start location (e.g., the kiosk location) and the selected endpoint location, for retrieval and transmission to the mobile device 150. As seen in FIG. 3B, the content 320 received and presented by the mobile device 150 at block 250 includes a similar (and in some examples, identical) portion of the map as displayed by the kiosk 104. As also seen in FIG. 3B, the URL 324 received at block 240 includes an identifier of the content server 132 ("m.abc.ca") as well as the location identifiers mentioned earlier. The content 320 returned to the mobile device 150 by the content server 132 at block 245 includes, in addition to the relevant portion of the map, the path 304. The path 304 need not be explicitly identified in the data exchanged by the routing server 128, kiosk 104, and mobile device 150 prior to block 240. Rather, the content server 132 can be configured to execute the same path generation operation as implemented by the kiosk 104, ensuring that for a given start and destination locations, the content server 132 and the kiosk 104 generate the same path 304.

Returning to FIG. 2, at block 255, the routing server 128 is configured to purge (i.e., delete from memory) the link stored at block 215. The link may be purged in response to various conditions being met. For example, the server 128 can be configured to purge each link stored at block 215 after a configurable time period (e.g. two minutes). In other examples, the server 128 can be configured to purge the link after a request is received from a mobile device 150 at block 230. In still further examples.

As will be apparent, in some situations the link stored at block 215 may be purged at block 255 before the mobile device 250 has sent the request at block 225 (e.g. if there is a delay in obtaining the identifiers by the mobile device 250). The routing server 128 may be configured to return an error message to the mobile device 250 at block 235, rather than the redirect.

Variations to the above systems and methods are contemplated. For example, the routing server 128 and the content server 132 can be combined, such that the redirect at block 235 is omitted. In further variations, to protect the privacy of the mobile device 150, in addition to the above mechanisms for purging the link stored at block 215 the kiosk 104 and the routing server 128 can be configured to deploy authentication tokens. For example, the kiosk 104 can present on the display 112 a token for inclusion in the request at block 225. For example, the token may be entered via an input device on the mobile device 150, and sent along with the kiosk and server identifiers obtained at block 220. The kiosk 104 may be configured to cycle through a plurality of tokens (e.g. at random, with a seed also stored at the server 128). Thus, a subsequent mobile device may be prevented from retrieving the same content shown in FIG. 3B because the token is no longer presented on the display 112.

In further embodiments, at block 245 the content server 132 is configured not only to transmit content to the mobile device 150 as discussed above, but also to establish a persistent bidirectional connection with the mobile device 150 (e.g. via the WebSocket protocol or any other suitable communications protocol). For example, the content server 132 and the mobile device 150 can exchange socket identifiers (e.g. each consisting of an IP address and a port number, or any other suitable set of parameters) and store the socket identifiers in memory. The content server 132 is then configured to transmit the content to the mobile device 150 over the above-noted persistent connection. Further, the content server 132 can be configured to retrieve and transmit further content to the mobile device 150, with or without further requests from the mobile device 150. The further content can include updated map data, e.g. illustrating a different portion of the facility or containing a different path (e.g. responsive to receiving an indication of a current location of the mobile device 150 at the content server 132 via the persistent connection). The persistent connection is torn down responsive to an indication from the mobile device 150 that the browser application at the mobile device 150 has been terminated.

Figure 4:
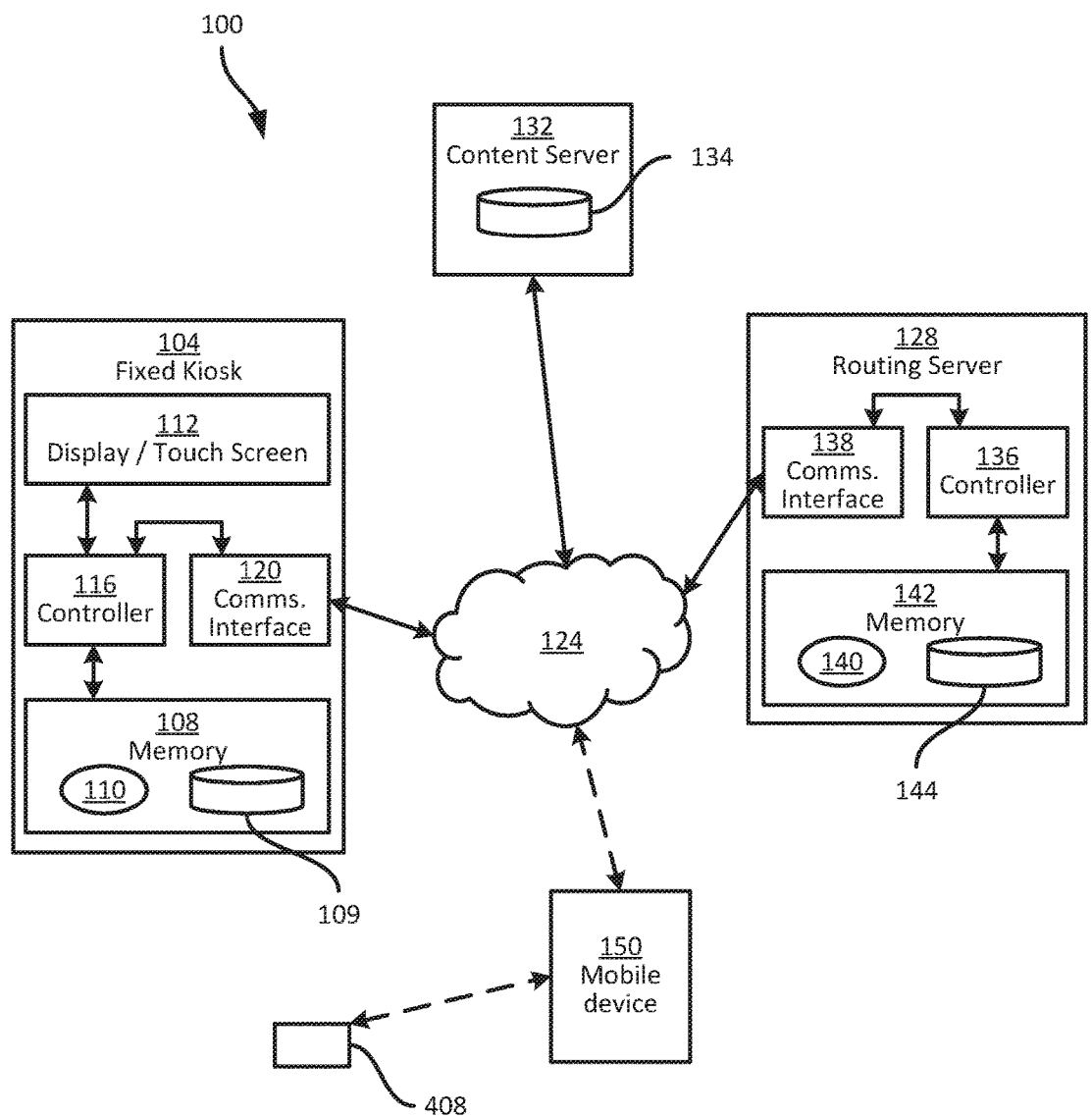
FIG. 4 depicts a system for dynamically transmitting content to mobile devices, according to another embodiment.

In further embodiments, as shown in FIG. 4, the system 100 can include one or more fixed (i.e. placed at static physical locations within the facility) tags 408, such as BLE tags or any other suitable short-range communications component. Each tag 408 stores data, such as a URL, identifying the content server 132 (e.g. by the domain m.abc.ca) and also identifying the location of the tag 408 itself. In other words, the tag 408 may store the URL "m.abc.ca/from=B7". Upon placement in physical proximity to the tag 408, the mobile device 150 retrieves the above-noted URL, and may be redirected to the content server 132, which may then be configured to prompt the mobile device 150 for a destination location, before generating a path and transmitting content as discussed above in connection with block 245. As will now be apparent, the tags 408 can be deployed throughout a facility that does not include a kiosk 104.

In other embodiments, both the tag 408 and the kiosk 104 are deployed in the facility. The tag 408 stores data (e.g. a URL) identifying the routing server 128 and the location of the tag 408 within the map. The mobile device 150 may interact with the kiosk 104 and routing server 128 as discussed above to specify a destination location, Upon retrieving the above-mentioned URL from the tag 408, the mobile device 150 is therefore configured to query the routing server 128 for the content identifier (which specifies the destination location as well as the location of the kiosk as a start location), replace the "from" location (originally the location of the kiosk 104) with the location from the tag 408, and query the content server 132.

The scope of the claims should not be limited by the embodiments set forth in the above examples, but should be given the broadest interpretation consistent with the description as a whole.

The invention claimed is:

1. A method of transmitting dynamic content to a mobile device, comprising:
    storing content in a memory of a kiosk deployed in a facility;
    receiving, via an input device of the kiosk, a command to present a portion of the content;
    responsive to receiving the command:
        controlling an output device of the kiosk to present the portion of the content; and
        transmitting, to a routing server via a network, a preconfigured identifier of the kiosk and an identifier of the portion of the content, for subsequent retrieval by a mobile computing device.

2. The method of claim 1, further comprising:
    subsequent to the transmitting, providing an identifier of the routing server to the mobile computing device.

3. The method of claim 2, wherein providing an identifier of the routing server comprises generating a machine-readable indicium via the output device, for capture by the mobile computing device.

4. The method of claim 2, wherein providing an identifier of the routing server comprises transmitting the identifier of the routing server to the mobile computing device via a short-range communications interface of the kiosk.

5. The method of claim 1, further comprising:
    at the routing server, receiving the preconfigured kiosk identifier and the content portion identifier; and
    storing the content portion identifier in association with the kiosk identifier.

6. The method of claim 5, further comprising:
    at the routing server, receiving a client request from the mobile computing device containing the routing server identifier and the kiosk identifier;
    responsive to receiving the client request, retrieving the content portion identifier corresponding to the kiosk identifier; and
    transmitting the content portion identifier to the mobile computing device, for retrieval of the content portion by the mobile computing device from a content server identified by the content portion identifier.

7. The method of claim 5, further comprising:
    at the routing server, deleting the content portion identifier subsequent to transmitting the content portion identifier to the mobile computing device.

8. A system for transmitting dynamic content to a mobile computing device, comprising:
    a routing server;
    a kiosk deployed in a facility, the kiosk including a memory storing content, an input device, and an output device; the kiosk configured to:
        receive, via the input device, a command to present a portion of the content;
        responsive to receiving the command, control the output device to present the portion of the content; and
        transmit, to the routing server via a network, a preconfigured identifier of the kiosk and an identifier of the portion of the content, for subsequent retrieval by the mobile computing device.

9. The system of claim 8, the kiosk further configured to:
    subsequent to the transmitting, provide an identifier of the routing server to the mobile computing device.

10. The system of claim 9, the kiosk configured to provide the identifier of the routing server by generating a machine-readable indicium via the output device, for capture by the mobile computing device.

11. The system of claim 9, the kiosk configured to provide the identifier of the routing server by transmitting the identifier of the routing server to the mobile computing device via a short-range communications interface of the kiosk.

12. The system of claim 8, the routing server configured to:
    receive the preconfigured kiosk identifier and the content portion identifier; and
    store the content portion identifier in association with the kiosk identifier.

13. The system of claim 12, the routing server further configured to:
    receive a client request from the mobile computing device containing the routing server identifier and the kiosk identifier;
    responsive to receiving the client request; retrieve the content portion identifier corresponding to the kiosk identifier; and
    transmit the content portion identifier to the mobile computing device, for retrieval of the content portion by the mobile computing device from a content server identified by the content portion identifier.

14. The system of claim 12, the routing server further configured to:

delete the content portion identifier subsequent to transmitting the content portion identifier to the mobile computing device.

\* \* \* \* \*